(12) United States Patent
Kolkman et al.

(10) Patent No.: US 12,391,021 B2
(45) Date of Patent: Aug. 19, 2025

(54) LAYERED MATERIAL

(71) Applicant: DSM IP Assets B.V., Heerlen (NL)

(72) Inventors: Ard Kolkman, Echt (NL); Armand Alphons Marie Agnes Duijsens, Echt (NL); Andreas Antonius Oosterlaken, Echt (NL)

(73) Assignee: ENVALIOR B.V., Geleen (NL)

( * ) Notice: Subject to any disclaimer, the term of this patent is extended or adjusted under 35 U.S.C. 154(b) by 246 days.

(21) Appl. No.: 17/795,134

(22) PCT Filed: Jan. 26, 2021

(86) PCT No.: PCT/EP2021/051760
§ 371 (c)(1),
(2) Date: Jul. 25, 2022

(87) PCT Pub. No.: WO2021/151892
PCT Pub. Date: Aug. 5, 2021

(65) Prior Publication Data
US 2023/0052428 A1    Feb. 16, 2023

(30) Foreign Application Priority Data
Jan. 27, 2020  (EP) ..................................... 20153908

(51) Int. Cl.
*B32B 7/12* (2006.01)
*B32B 27/28* (2006.01)
(Continued)

(52) U.S. Cl.
CPC .............. *B32B 7/12* (2013.01); *B32B 27/285* (2013.01); *B32B 27/36* (2013.01); *B32B 37/153* (2013.01);
(Continued)

(58) Field of Classification Search
None
See application file for complete search history.

(56) References Cited

U.S. PATENT DOCUMENTS

| 4,725,483 A | 2/1988 | Ishii et al. |
| 6,020,393 A * | 2/2000 | Khemani ............... C08G 63/60 528/307 |

(Continued)

FOREIGN PATENT DOCUMENTS

| CN | 101868351 | 10/2010 |
| CN | 101981081 | 2/2011 |

(Continued)

OTHER PUBLICATIONS

International Search Report for PCT/EP2021/051760 dated Mar. 10, 2021 (3 pages).

(Continued)

*Primary Examiner* — Vivian Chen
(74) *Attorney, Agent, or Firm* — Nixon & Vanderhye, P.C.

(57) ABSTRACT

The invention relates to a layered material, comprising a substrate and at least one layer A, wherein the at least one layer A comprises at least 50 wt % of a branched copolyester, wherein wt % is with respect to the total weight of layer A, and wherein the branched copolyester has a melting temperature of between 125° C. and 185° C., Mz/Mw of at least 3.5, and having a Melt Flow Index (MFI) of at most 10 g/10 min as measured at 190° C. with 2.16 kg. The invention also relates to a film comprising at least one layer A.

15 Claims, 2 Drawing Sheets

Layer A
--------
Substrate

(51) Int. Cl.
    *B32B 27/32*     (2006.01)
    *B32B 27/34*     (2006.01)
    *B32B 27/36*     (2006.01)
    *B32B 27/40*     (2006.01)
    *B32B 37/15*     (2006.01)
    *C08G 63/127*     (2006.01)
    *C08G 63/16*     (2006.01)
    *C08G 63/183*     (2006.01)
    *C08G 63/66*     (2006.01)
    *C08G 63/668*     (2006.01)
    *C08G 63/672*     (2006.01)

(52) U.S. Cl.
    CPC .............. *B32B 27/32* (2013.01); *B32B 27/34* (2013.01); *B32B 27/40* (2013.01); *B32B 2250/244* (2013.01); *B32B 2307/30* (2013.01); *B32B 2307/732* (2013.01); *B32B 2309/105* (2013.01); *B32B 2367/00* (2013.01); *C08G 63/127* (2013.01); *C08G 63/16* (2013.01); *C08G 63/183* (2013.01); *C08G 63/66* (2013.01); *C08G 63/668* (2013.01); *C08G 63/672* (2013.01)

(56) References Cited

U.S. PATENT DOCUMENTS

| | | | |
|---|---|---|---|
| 6,607,797 | B1 | 8/2003 | Ritter |
| 8,287,972 | B2 | 10/2012 | Aussems et al. |
| 8,541,109 | B2 | 9/2013 | Bastioli et al. |
| 2002/0004578 | A1* | 1/2002 | Shelby ................ C08G 63/668 |
| | | | 528/183 |
| 2007/0065614 | A1 | 3/2007 | Schulthess |
| 2009/0264545 | A1* | 10/2009 | Sequeira ................ C08L 67/03 |
| | | | 525/418 |
| 2010/0048081 | A1* | 2/2010 | Topolkaraev .......... D04H 3/153 |
| | | | 442/400 |
| 2011/0020660 | A1 | 1/2011 | Bastioli et al. |
| 2011/0045224 | A1 | 2/2011 | Heuvel Van Den et al. |
| 2011/0071238 | A1* | 3/2011 | Bastioli ................... C08L 67/02 |
| | | | 524/72 |
| 2011/0301283 | A1* | 12/2011 | Schellekens ............. C08K 7/14 |
| | | | 524/604 |
| 2012/0178837 | A1* | 7/2012 | Mehta .................... C08G 63/20 |
| | | | 525/418 |
| 2016/0237209 | A1* | 8/2016 | Kim ....................... C08J 9/0028 |
| 2016/0326308 | A1* | 11/2016 | Kim ........................ C08L 101/16 |
| 2020/0047460 | A1* | 2/2020 | Nguyen ..................... B32B 7/12 |
| 2020/0148813 | A1* | 5/2020 | Young .................. C08G 63/183 |
| 2020/0157342 | A1* | 5/2020 | Young ..................... C08K 5/13 |
| 2020/0263027 | A1* | 8/2020 | Cable ..................... C08L 67/02 |

FOREIGN PATENT DOCUMENTS

| | | |
|---|---|---|
| CN | 101868486 | 7/2013 |
| CN | 104448281 | 3/2015 |
| DE | 10 2008 038 375 | 2/2010 |
| EP | 1 518 761 | 3/2005 |
| EP | 1 731 302 | 12/2006 |
| EP | 1 764 212 | 3/2007 |
| JP | 2003-313308 A * | 11/2003 |
| KR | 2007-0012410 A * | 1/2007 |
| WO | WO97/19126 | 5/1997 |
| WO | 2018/230721 | 12/2018 |
| WO | 2018/230722 | 12/2018 |

OTHER PUBLICATIONS

Written Opinion of the ISA for PCT/EP2021/051760 Mar. 10, 2021 (5 pages).

* cited by examiner

LAYERED MATERIAL

CROSS-REFERENCE TO RELATED APPLICATIONS

This application is the U.S. national phase of International Application No. PCT/EP2021/051760 filed Jan. 26, 2021 which designated the U.S. and claims priority to EP EP20153908.7 filed Jan. 27, 2020, the entire contents of each of which are hereby incorporated by reference.

FIELD

This invention relates to a layered material, a process for preparation of the layered material, a film suitable for application in the layered material as well as applications of the layered material.

BACKGROUND AND SUMMARY

Layered materials are known and for example applied in inflatable protective cushions in vehicles, also known as airbags. Protective cushions prevent against frontal or lateral impact of a passenger. These cushions have to comply with numerous requirements. Particularly for lateral applications, these cushions have to be able to contain a certain pressure for a particular amount of time. In case a vehicle rolls over, the gas in a cushion has to remain within the cushion for a longer period, thereby preventing a passenger being ejected from the vehicle and/or preventing injuries on a passenger.

Layered materials currently used in airbags are prepared by laminating a foil onto a fabric layer, which is for example described in U.S. Pat. No. 6,607,797. A disadvantage of this gas bag material is that the material employed exhibits insufficient hydrolysis resistance and/or heat resistance. Another solution is to employ copolyester as for example described in WO18230721. A disadvantage of this solution is that the foil has to be prepared by blown film process in which a support layer is employed or a three layer film has to be used. This support layer has to be discarded after production, which makes the process expensive or a thicker solution has to be used, which results in higher costs and more material required.

It is thus an object of the present invention to provide a layered material, which comprises a layer which layer may be prepared by a blown film process without the need of a support layer and/or which may be present at lower thicknesses.

This object is obtained with a layered material comprising a substrate and at least one layer A, wherein the at least one layer A comprises at least 50 wt % of a branched copolyester, wherein wt % is with respect to the total weight of layer A, and wherein the branched copolyester has a melting temperature of between 125° C. and 185° C., Mz/Mw of at least 3.5, and has a Melt Flow Index (MFI) of at most 10 g/10 min as measured at 190° C. with 2.16 kg.

Surprisingly, the layered material of the invention allows for easy production, high blow up ratios and stable blow film properties with having excellent melt stability, while sufficient adhesion to a substrate may be obtained.

Definitions

"Multilayer" is herein understood to comprise at least two layers, and potentially at least three or even at least four layers, and may even comprise more than four layers, depending on the intended use of the layered material. The maximum amount of layers in a multilayer depend on the intended use and may be as high as 10 layers.

"(Co) polyester" is herein understood to include both polyester and copolyester.

"(Co) polyamide" is herein understood to include both polyamide and copolyamide.

The melting temperature ($T_m$) of a thermoplastic material and in particular a copolyester is routinely determined using differential scanning calorimetry (DSC) according to ISO 11357-3:2011 under nitrogen atmosphere. The melting temperature is defined as the peak temperature thus the maximum height in the endotherm from the associated chromatogram of the highest temperature melting peak determined using a heating rate of 10° C./min on the second heating. The instrument should be calibrated by an indium standard. Aluminum pans are employed to hold a small portion of the thermoplastic copolyester elastomer, preferably between 5 and 10 mg. The samples are heated at a constant rate of 10° C./min to a temperature at least 20° C. above the highest melting temperature, preferably to a temperature of at least 240° C. The sample is then cooled at a rate of 10° C./min to a temperature of at most 0° C., more preferably to a temperature of at most −50° C. to erase any variable thermal history. The sample is then heated again at a constant rate of 10° C./min to a temperature at least 20° C. above the highest melting temperature, preferably to a temperature of at least 240° C.

BRIEF DESCRIPTION OF THE DRAWINGS

FIG. 1 represents a layered material comprising a substrate and one layer A.

FIG. 2 represents a layered material in which between the substrate and Layer A a further layer B is present.

FIG. 3 represents a layered material similar to FIG. 1 in which a further layer B is present opposite to the substrate.

FIG. 4 represents a layered material in which the substrate is in contact with Layer A and a further layer B.

FIG. 5 represents a schematic representation in which layer A is partially embedded in the substrate, which may particularly the case if the substrate contains voids, such as in the case of a woven or non-woven. The substrate is presented as circles and an arrow indicates the maximum thickness of Layer A.

FIG. 6 represents a schematic representation in which layer A is almost fully embedded in the substrate, which may particularly the case if the substrate contains voids, such as in the case of a woven or non-woven. The substrate is presented as circles and an arrow indicates the maximum thickness of Layer A.

DETAILED DESCRIPTION OF EMBODIMENTS

Substrate

The layered material according to the invention comprises a substrate.

"Substrate" is herein defined as a material on which a process is conducted to produce the layered material, preferably, the process is adhering of a film, more preferably laminating of a film to produce the layered material.

The substrate may be chosen from various materials and forms and depends on the intended use of the layered material. The substrate may for example be in the form of a woven, non-woven, film, laminate, fabric, plate, sheet, foam and combinations of these. The substrate is preferably a woven, such as for example a textile, if for example applied in airbags, more preferred in side curtain airbag.

The substrate may comprise various materials, such as for example plastics including polyamide, polyester, polyolefins, polyurethanes, as well as copolymers and/or mixtures thereof. The substrate may also comprise other materials such as for example materials including wood, cotton, flax, glass, metal and also combinations of plastics and other materials. For use in airbags, the substrate preferably is a woven comprising polyamide, copolyamide, polyester or copolyester, more preferably polyester or copolyester, as this facilitates recycling, more preferably, the substrate is a one piece woven comprising (co) polyester, more preferred the substrate substantially consists of (co) polyester.

A "one piece woven" (OPW) is a product made with a special weaving technology that makes it possible to bypass a sewing process and is known as such. OPW enables creation of bags that can be blown in a single woven structure.

Preferably, the material of the substrate has a melting temperature as measured by DSC according to ISO 11357-3:2011 which melting temperature is higher than the melting temperature of the branched copolyester in layer A, preferably at least 20° C. higher, more preferably at least 30° C. higher. This facilitates lamination of layer A onto the substrate. If the substrate comprises various materials, the melting temperature of the substrate is preferably defined as the highest melting temperature of the individual materials.

Figure 5:
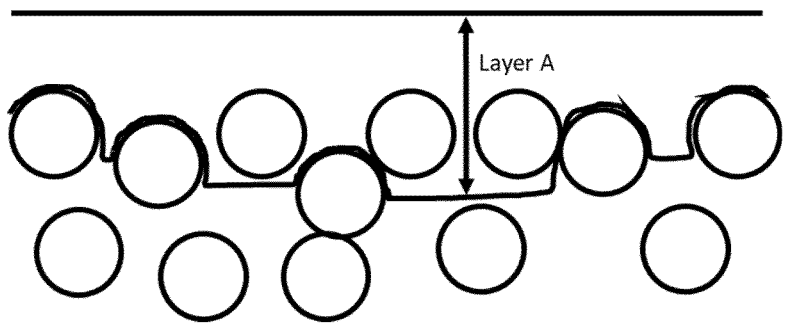

The substrate may contain voids, for example if the form is a woven or non-woven or foam or one piece woven. Layer A, if directly applied to the substrate may in that case be partially embedded in the substrate, which is schematically represented in FIG. 5. The thickness of Layer A is in this case defined as the maximum thickness indicated by an arrow in FIG. 5. If a further layer B is directly applied to the substrate, also this layer may be partially embedded in the substrate.

Layer A

The layered material according to the invention comprises at least one layer A, also referred to as "layer A". Layer A comprises a branched copolyester having a melting temperature of between 125° C. and 185° C., as measured by DSC according to ISO 11357-3:2011, an Mz/Mw of at least 3.5 and having an MFI of at most 10 g/10 min as measured at 190° C. with 2.16 kg.

Layer A comprises at least 50 wt % of the branched copolyester, more preferably at least 65 wt %, even more preferred at least 80 wt %, wherein weight percentage is with respect to the total weight of layer A. Layer A may also substantially consist of the branched copolyester.

Layer A comprises a branched copolyester having preferably a melting temperature of between 130° C. and 175° C., more preferably between 140° C. and 165° C., and even more preferred between 145° C. and 160° C. The melting temperature of the branched copolyester can be adjusted by the amounts of hard segments and/or soft segments, as well as the type of hard segments and/or soft segments. Preferably, the branched copolyester comprises as hard segments PBT and PBI, which decreases the melting temperature of the branched copolyester, as compared to a branched copolyester comprising as hard segments PBT only.

Layer A may contain further additives such as for example heat stabilizers, colorants, nucleating agents, UV stabilizers, lubricants, plasticizers. Usually these further additives are present in layer A in an amount of at most 10 wt %, preferably at most 5 wt %, with respect to the total weight of layer A.

Figure 1:
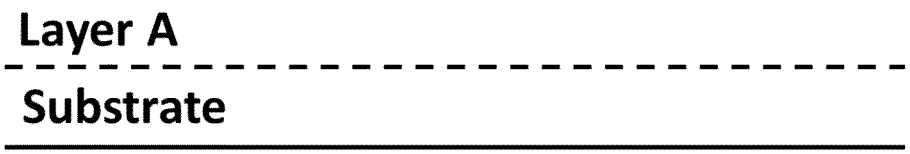
FIGS. 1 to 6 schematically represent several embodiments of the layered material. Dotted lines represent surfaces which may be partially or substantially fully embedded, as further represented in FIGS. 5 and 6, respectively.
Figure 2:
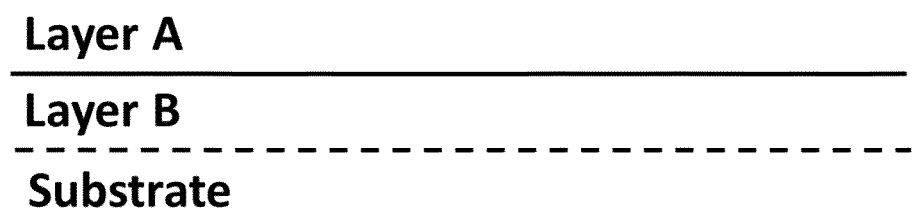
Figure 6:
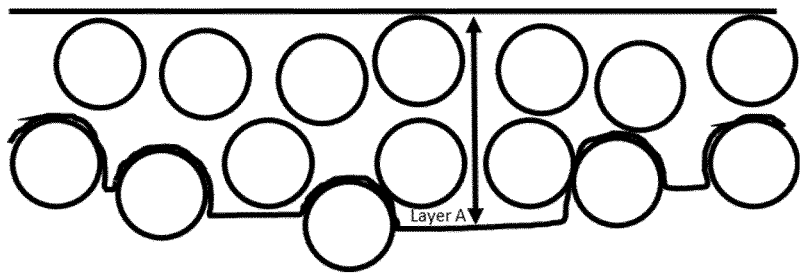

Layer A may be in contact with the substrate as indicated in FIG. 1, but also may be separated by a further layer B such as indicated in FIG. 2. Layer A may also be partially embedded in the substrate, which preferably is the case if the substrate is a woven. This particular situation is schematically represented by FIG. 5. Layer A may also be almost fully embedded in the substrate, which is schematically represented by FIG. 6.

Layer A may be prepared by various methods, including for example by extrusion coating, cast film process, blown film process. Preferably layer A is prepared by a blown film process. Surprisingly, layer A comprising at least 50 wt % of a branched copolyester wherein wt % is with respect to the total weight of layer A, the branched copolyester having a melting temperature of between 125° C. and 185° C., and having an MFI of at most 10 g/10 min as measured at 190° C. with 2.16 kg and an Mz/Mw of at least 3.5, allows for production by a simple blown film process. Advantage of layer A prepared by blown film process is that a support layer may be omitted, higher processing speed may be used upon production of layer A, lower thicknesses may be obtained, and/or higher blow-up ratio's may be attained, which may result in higher widths of the film. Layer A may be prepared as monolayer, but layer A may also be prepared as multilayer, thereby comprising at least one further layer B.

Branched Copolyester

Layer A comprises a branched copolyester having a melting temperature of between 125° C. and 185° C., an Mz/Mw of at least 3.5 and having an MFI of at most 10 g/10 min as measured at 190° C. with 2.16 kg.

"Copolyester" is herein understood to be a polymer comprising hard segments of a polyester and soft segments. Hard segments of a polyester may for example be polyethylene terephthalate (PET), polypropylene terephthalate (PPT), polybutylene terephthalate (PBT), polybutylene isophthalate (PBI), polyethylene isophthalate (PEI), polyethelyene naphthalate, polybutylene naphthalate, and polypropylene naphthalate and combinations thereof. Preferably, the hard segment is a combination of PBT and PBI, as this is readily available and allows for lower melting temperatures of the copolyester.

Soft segments may be chosen from a wide range of polymers and include for example polytetramethylene oxide (PTMO), polyethylene oxide (PEO), polypropylene oxide (PPO), block copolymers of poly(ethylene oxide) and poly (propylene oxide), linear aliphatic polycarbonates, polybutylene adipate (PBA) and derivates of dimer fatty acids or dimer fatty acid diols, linear aliphatic polyesters and combinations thereof. Preferably, the soft segment comprises polytetramethylene oxide (PTMO), as this provides sufficient hydrolytical stability.

The branched copolyester has an Mz/Mw of at least 3.5, preferably at least 3.7, and more preferably at least 3.9. The branched copolyester preferably has an Mw/Mn of at least 2.1, more preferably at least 2.2, even more preferably at least 2.3 and most preferred at least 2.4. Higher values of Mz/Mw indicate higher branching, which is beneficial for processing the branched copolyester into a film.

Figure 7:
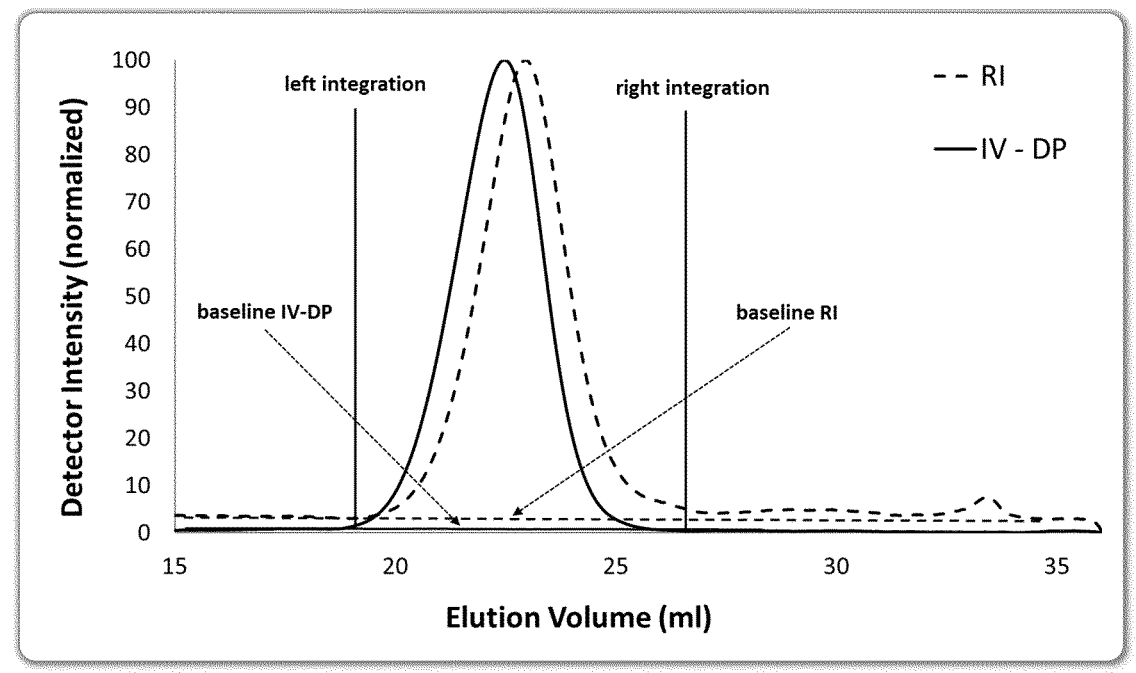
FIG. 7 provides an example of SEC chromatogram with integration limit (vertical lines) and baseline (horizontal lines) settings for determination of the molar mass moments and the molar mass distribution values, based on refractive index (RI) and differential viscosity chromatograms (IV-DP).

Number average molecular weight (Mn), weight average molecular weight (Mw) and Z average molecular weight (Mz) can be determined by size exclusion (SEC) method, as explained below. SEC method for molar mass determination is generally described in ASTM: D5296-11 (2011). Additionally, ASTM norm D 5226-98 (2010) defines solvents, which can be used for polymer analysis. For thermoplastic copolyester elastomers the solvent hexafluoroisopropanol containing 0.1 wt. % potassiumtriflouroacetate is employed. All Size Exclusion Chromatography measurements are performed on Viscotek GPCMax VE2001 solvent/sample module system, equipped with TDA305 triple detector array. For chromatographic separation, 3 PFG linear XL columns from PSS Polymer Standards Service GmbH are used. Detectors and columns are operated at 35° C. Prior Size Exclusion Chromatography, polymer is dissolved at concentration ranging from 1.0 to 1.5 mg/ml in hexafluoroisopropanol containing 0.1 wt. % potassiumtriflouroacetate, which is also used as an eluent in SEC analysis at a flow rate of 0.8 ml/min. The molar mass and molar mass distribution are determined with triple detection method, using the refractive index, differential viscosity and right-angle light scattering signals. For calculation of molecular weight averages and molar mass distribution, refractive index indices (dn/dc's) in a range of 0.22 to 0.24 ml/g are used. Calculations of molar mass moments and molar mass distributions are performed with OmniSEC software version 4.7. The refractive index indices are determined by integration of the whole refractive index chromatograms. Integration limits for molar mass moments and molar mass distribution calculations are set by taking into account the beginning and the end of the differential viscosity chromatogram recorded for a sample of interest. FIG. 7 provides an example of integration limit setting. Further details for these calculations can be found in Niehaus, D. E., Jackson, C. "Size exclusion chromatography of step-growth polymers with cyclic species: theoretical model and data analysis methods", Polymer 41 (2000), 259-268.

If multiple branched copolyesters are present in layer A, the total amount of the branched copolyesters has to be at least 50 wt % with the respect to layer A, and the Mz/Mw, Mw/Mn, melting temperature and MFI values have to be measured with respect to the total amount of branched copolyesters.

The branched copolyester has an MFI of at most 10 g/10 min as measured at 190° C. with 2.16 kg. MFI can be measured according to ISO 1133-1, procedure B. Measurements are performed with a standard die with an opening of around 2 mm diameter, melting time is 300 seconds. The amount of weighted sample is between 4.5 and 5.0 gram. Prior to weighing the material is dried for 2 hours at 150° C. Preferably, the branched copolyester has an MFI of at most 7 g/10 min and even more preferred the MFI is at most 5 g/10 min, most preferred at most 3 g/10 min, as measured at 190° C. with 2.16 kg, as this allows for easier handling, especially when prepared by blown film process. If the MFI as measured at 190° C. with 2.16 kg is very low, the melt flow stability is insufficient to measure at this weight, and a higher weight of 10 kg has to be applied. In this case the MFI preferably is at most 25 g/10 min as measured at 190° C. with 10 kg, more preferably at most 20 g/10 min.

The branched copolyester may be prepared by processes known per se, which include melt polymerization, usually followed by melt finishing to obtain the desired MFI. Other preparation techniques include for example melt polymerization followed by reactive extrusion using compounds having two or more reactive groups to the copolyester, for example compounds having epoxy, carbodiimide or isocyanate groups. Isocyanate compounds include for example methylene diphenyl diisocyanate (MDI), liquified methylene diphenyl diisocyanate (l-MDI), polymeric MDI, trilene diisocyanate, dianiside diisocyanate, diphenylether diisocyanate, naphthalene diisocyanate, triphenylmethane triisocyanate, triisocyanate phenylthiophosphate, hexamethylene diisocyanate, isophorone diisocyanate, lysine diisocyanate methyl ester, methxylylene diisocyanate, 2,2,4-trimethyl-hexamethylene diisocyanate, diisocyanate dimerate, isopropylidene bis (4-cyclohexylisocyanate), dicyclohexylmethane diisocyanate, methylcyclohexane diisocyanate and the like. Two or more of isocyanates may also be employed. These may be employed in amounts of for example between 0.01 wt % and 2.00 wt %, relative to branched copolyester. Branching is obtained by employing branching agents in the process for preparing the branched copolyesters.

"Branching agents" are known per se and are herein understood to be molecules having at least three functional groups which are able to react with monomers, oligomers or polymers to introduce branching in a polymer. Branching agents include for example trimethylol propane (TMP), di(trimethylolpropane), pentaerythritol, di pentaerithritol, tri pentaerithritol, trimethyl trimellitate, tributyl trimellitate, 2-hydroxymethyl-1,3-propanediol, Trioctyl trimellitate (TOTM), trihexyl trimellitate (THTM). Branching agents may be employed in amounts of between 0.01 wt % and 2.00 wt %, relative to branched copolyester and depends on the required degree of branching.

Layered Material

Figure 3:
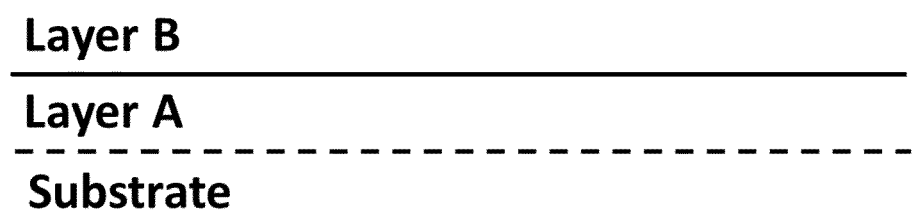
Figure 4:
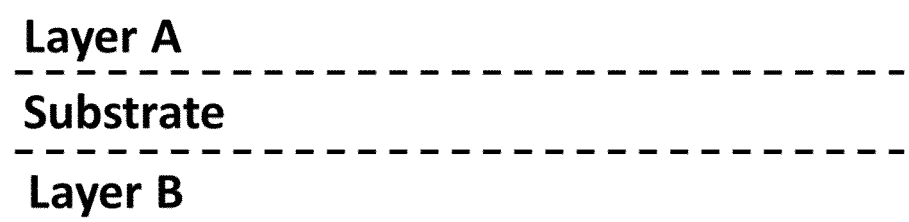

The layered material may optionally comprise one or more further layers B. The one or more further layers B may be positioned between the substrate and layer A (FIG. 2), but in case layer A and the substrate are in contact with each other, one or more further layers B are positioned opposite to layer A (FIG. 3) or opposite to the substrate (FIG. 4). The layered material may also contain multiple further layers B, for example both position opposite to both sides layer A and/or opposite to both sides of the substrates. Multiple further layers B may be of the same material, but may also comprise different materials.

Layer B may be prepared together with layer A, thus as a film comprising at least two layers. Layer B may also be prepared separately, and subsequently be added upon production of the layered material.

Layer B may comprise various materials, such as for example polyester, copolyester, polyamide, copolyamide, thermoplastic polyurethane, polyolefin, grafted polyolefin as well as combinations thereof and may be a mono-layer, but may also be a multilayer. Preferably, layer B comprises a branched copolyester, as this has the advantage to further stabilize melt stability during blow film processing. Even more preferred, layer B comprises a material with a melting temperature $T_{mB}$ being higher than the $T_m$ of the branched copolyester employed in layer A, as this has the advantage that upon lamination to a substrate, layer A will melt and partially or potentially completely flow into the open structure of the substrate as exemplified in FIGS. 5 and 6 respectively, whereas layer B is not deformed and maintains its strength.

Layer B may contain further additives such as for example heat stabilizers, colorants, nucleating agents, UV stabilizers, lubricants, plasticizers. Usually these further additives are present in layer B in an amount of at most 10 wt %, preferably at most 5 wt %, with respect to the total weight of layer B.

Layer B may be prepared by methods as disclosed similar to layer A above. Preferably, layer A and B are prepared together by a multilayer film process by blown film process.

The layered material according to the invention may be prepared by processes known per se, such as laminating layer A to the substrate or by employing an adhesive to apply layer A to a substrate.

"Laminating" is herein understood to comprise steps of heating and applying pressure, wherein either the substrate or layer A is melted. Preferably, layer A and/or B is melted and the substrate remains substantially solid. Most preferred, layer A is melted and the substrate remains substantially solid.

Film Comprising Layer a

The invention also relates to a film suitable for application in a layered material comprising a substrate, which film comprises or consists of at least one layer A comprising a branched copolyester having a melting temperature of between 125° C. and 185° C., Mz/Mw of at least 3.5 and having an MFI of at most 10 g/10 min as measured at 190° C. with 2.16 kg. All preferments and embodiments disclosed above explicitly also refer to this film, particularly the preferments and embodiments relating to the branched copolyester.

Preferably, the film has a thickness of between $1*10^{-5}$ and $100*10^{-3}$ mm, more preferred between $1*10^{-5}$ mm and $60*10^{-3}$ mm, even more preferred between $1*10^{-5}$ mm and $50*10^{-3}$ mm and most preferred between $1*10^{-5}$ mm and $40*10^{-3}$ mm.

Preferably, the film is prepared by blown film process, as this allows for easy production. In one embodiment the film consists of layer A. In another embodiment, the film comprising at least one layer A, further comprises another layer, hereafter denoted as layer B. The embodiments above referring to layer B, also relate to the film according to the invention comprising at least one layer A and further comprising a layer B.

In a preferred embodiment, the film according to the invention comprises at least one layer A and a layer B, and is prepared by blown film process. More preferred, the film according to the invention comprises at least one layer A as disclosed above and a layer B, wherein layer B comprises a material with a melting temperature $T_{mB}$ being higher than the $T_m$ of the branched copolyester employed in layer A. This has the advantage that upon lamination of the film comprising layer A and layer B, to a substrate, layer A will melt and partially or potentially completely flow into the open structure of the substrate as exemplified in FIGS. 5 and 6 respectively, whereas layer B is not deformed and maintains its strength. Most preferred, layer B is a (co) polyester, as this facilitates recycling of the film.

The film according to the invention may advantageously be employed in applications where for example protection against gasses and/or liquids is required, or for example against mechanical influences and more preferred in air bags production, most preferred in production of side curtain air bags.

Preferably, the film according to the invention comprises or consists of a branched copolyester, wherein the branched copolyester comprises hard segments of polybutylene terephthalate (PBT) and polybutylene isophthalate (PBI), and soft segments of polytetramethylene oxide (PTMO), polyethylene oxide (PEO), polypropylene oxide (PPO), block copolymers of poly(ethylene oxide) and poly(propylene oxide), linear aliphatic polycarbonates, polybutylene adipate (PBA) and derivates of dimer fatty acids or dimer fatty acid diols, linear aliphatic polyesters and combinations thereof. More preferably, the soft segment is polytetramethylene oxide (PTMO).

The layered material is suitable for a wide range of applications including for example airbags, particularly side curtain airbags, roofing, house wrap applications, protective film and medical applications such as drapes.

EXAMPLES

Comparative Material A is Hytrel® 4056; available from Dupont. Hytrel® 4056 is a thermoplastic copolyetherester based on PBT/PBI hard segments and soft segments of poly tetramethylene oxide (PTMO) with a molecular weight of 1000. Hytrel® 4056 has a melting temperature of 150° C. and an MFI of 5 g/10 min (2.16 kg, 190° C., ISO 1133-1, procedure B).

Comparative Material B is a copolyester with PBT/PBI hard segments and poly tetramethylene oxide (PTMO) with a molecular weight of 1000 as soft segment. Comparative Material B has a melting temperature of 162° C. and an MFI of 4.5 (2.16 kg, 190° C., ISO1133-1, procedure B). Comparative Material B was made in a two-step process. First a base polymer was produced at a relative low viscosity using melt polymerization process, known to a person skilled in the art. In a second step, reactive extrusion, using various amounts liquified diphenyl methylene diisocyanate (I-MDI), was performed to increase viscosity to achieve the desired MFI as specified in Table 1. The reactive extrusion process was performed at an ZSK40MC+ extruder, operated at 200 rpm, having a throughput of 54 kg/hr and barrel temperatures of 250° C. Comparative Material B had an I-MDI content of 0.56 wt %.

Materials 1-4 were prepared by adding a branching agent at the feed throat of the reactive extrusion set-up to Comparative Material B and increasing the amount of I-MDI.

Material 1 contains 0.4 m/m % trimethylolpropane as branching agent, 1.3 to 1.5 m/m % I-MDI and 100–0.4–[I-MDI-Material1]+ [I-MDI-Comparative B] m/m % comparative material B.

Material 2, 3, and 4 contain 0.3 m/m % pentaerythritol as branching agent, 1.2 to 1.6 m/m % I-MDI and 100–0.3–[I-MDI-Material]+ [I-MDI-Comparative B] m/m % comparative material B.

Material 2 had 1.55 wt % of I-MDI and Material 4 had 1.25 wt % I-MDI and both Material 1 and 3 had 1.45 wt % I-MDI, in which wt % is with respect to the total amount of Material.

The melt strength of the tested materials were routinely determined using the Rheotens test according to ISO 16790: 2005. The Rheotens test exhibits the drawability of molten polymers, which is important for many industrial processes such as extrusion, fiber spinning, film blowing, blow molding etc. A high melt strength is indicative for a good bubble stability and/or higher blow up ratio during a film blowing process.

The experimental setup for measuring the melt strength consisted of a Capillary extrusion Rheometer, Göttfert Rheograph 75, and a Rheotens apparatus, Rheotens 71.97, manufacturer: Göttfert, as a take up device. Rheotens 71.97 has a force measuring range 0-2.0 N with a resolution of 1 mN. The melt strength results presented here followed the following measuring protocol. First, the samples were dried under vacuum at 80° C. for at least 14 hours. The granules were then fed (filling time<1 minute) into a preheated rheometer oven (T=190° C., diameter=12 mm) of the capillary rheometer and then waited for 5 minutes, allowing the granules to melt. A capillary die was used for all materials with a L/D=30/2 mm and a flat entrance angle (180°) thereby extrudating the melt into a filament. The piston velocity of the rheometer was set to $V_{piston}$=0.049 mm/s, which resulted into a filament velocity of 1.8 mm/s. The draw down distance between the die exit and take-up wheels was set to 10 cm to allow isothermal condition. The wheel gap was set to 0.2 mm and silicon oil was sprayed on the wheels to prevent sticking of the extruded strand. Laboratory temperature and humidity were controlled at 22±2° C., 45±5 rH respectively. At the beginning of the experiment, the take-up speed of the Rheotens wheels was set to the exit velocity of the filament resulting in a zero tensile force. The acceleration of the take up wheels was set to 1.2 mm/s² so the speed slowly started to increase until the polymer filament broke. Resulting tensile force versus drawdown speed was analyzed and corresponding melt strength values were reported. For each sample the melt strength measurement was repeated at least 3 times, mean and standard deviation of melt strength values are reported in table 1. Dependence of melt strength with temperature was also studied and an expected decrease in melt strength with higher temperatures in the rheometer oven was noticed.

The drawing characteristics of these materials i.e. melt strength were measured successfully, however the draw down ratio could not be reported as all filaments started to stick to the wheels at high velocities. A steady tensile force was obtained in all experiments thus an absolute melt strength value could be reported. Breaking of filaments was not observed so the drawdown ratio could not be reported for any of the materials.

TABLE 1

Materials

| Material | Hard segment (wt %) | Soft segment (wt %) | Tm (° C.) | Mn | Mw | Mw/Mn | Mz/Mw | MFI at 190° C. with 2.16 kg [g/10 min] | MFI at 190° C. with 10 kg [g/10 min] | Melt strength [cN] |
|---|---|---|---|---|---|---|---|---|---|---|
| Comparative Material A | 55 | 45 | 150 | 34200 | 73000 | 2.1 | 3.0 | 5.0 | | 0.6 ± 0.1 |
| Comparative Material B | 45 | 55 | 162 | 39600 | 78000 | 2.0 | 1.8 | 4.5 | | 0.5 ± 0.1 |
| Material 1 | 45 | 55 | 155 | 47900 | 113000 | 2.4 | 4.0 | 1.1 | | 7.2 ± 0.8 |
| Material 2 | 45 | 55 | 155 | 55100 | 143000 | 2.6 | 12.1 | 0.5 | | 6.0 ± 0.5 |
| Material 3 | 45 | 55 | 155 | 49100 | 125000 | 2.5 | 8.2 | 2.5 | 16.6 | |
| Material 4 | 45 | 55 | 155 | 43500 | 92000 | 2.1 | 5.1 | 4.7 | | 0.7 ± 0.1 |

Materials 1 to 4 can suitable be employed in a blown film process without the need of a support layer and/or which may be present at lower thicknesses to obtain a film according to the invention. Surprisingly, the film may be prepared by blown film process without the need of a support layer or films may be prepared exhibiting lower thicknesses. These films may be laminated onto a substrate thereby obtaining the layered material according to the invention.

Surprisingly, the melt strength of the materials 1 and 2 were much higher as compared to Comparative Material A and B. The melt strength is an indicator for expected blow up ratio and bubble stability when the materials are used in a blown film process.

The invention claimed is:

1. A layered material comprising:
   a substrate, and
   at least one layer A, wherein
   the at least one layer A comprises at least 50 wt % of a branched copolyester, wherein the wt % is with respect to the total weight of the layer A, and wherein
   the branched copolyester has a melting temperature of between 125° C. and 185° C., a ratio of Mz/Mw of at least 3.5, and a Melt Flow Index (MFI) of at most 10 g/10 min as measured at 190° C. with 2.16 kg.

2. The layered material according to claim 1, wherein the layer A is adhered to the substrate.

3. The layered material according to claim 1, wherein the at least one layer A has a maximum thickness of between $1*10^{-5}$ mm and $100*10^{-3}$ mm.

4. The layered material according to claim 1, further comprising a layer B, wherein the layer B comprises a material selected from the group consisting of polyester, copolyester, polyamide, copolyamide, thermoplastic polyurethane, polyolefin and combinations thereof.

5. The layered material according to claim 4, wherein the layer B is adhered to the layer A.

6. The layered material according to claim 5, wherein the layer A is adhered to the substrate.

7. The layered material according to claim 1, wherein the layer A comprises at least 80 wt % of the branched copolyester, wherein the wt % is with respect to the total weight of the layer A.

8. The layered material according to claim 1, wherein the layer A comprises a branched copolyester comprising hard segments of polybutylene terephthalate (PBT) and polybutylene isophthalate (PBI), and soft segments selected from the group consisting of polytetramethylene oxide (PTMO), polyethylene oxide (PEO), polypropylene oxide (PPO), block copolymers of poly(ethylene oxide) and poly(propylene oxide), linear aliphatic polycarbonates, polybutylene adipate (PBA), derivates of dimer fatty acids, derivates of dimer fatty acid diols, linear aliphatic polyesters and combinations thereof.

9. A method for preparing the layered material according to claim 1, wherein the method comprises a step of laminating a film comprising the layer A to the substrate.

10. The method according to claim 9, wherein the film comprising the layer A is prepared by a blown film process.

11. A film comprising at least one layer A, wherein the at least one layer A comprises at least 50 wt % of a branched copolyester, wherein the wt % is with respect to the total weight of the layer A, and wherein the branched copolyester has a melting temperature of between 125° C. and 185° C., a ratio of Mz/Mw of at least 3.5 and a Melt Flow Index (MFI) of at most 10 g/10 min as measured at 190° C. with 2.16 kg.

12. The film according to claim 11, wherein the at least one layer A comprises at least 80 wt % of the branched copolyester, wherein the wt % is with respect to the total weight of the layer A.

13. The film according to claim 11, wherein the branched copolyester has a melting temperature of between 140° C. and 160° C., and a Melt Flow Index (MFI) of at most 5 g/10 min as measured at 190° C. with 2.16 kg.

14. The film according to claim 11, wherein the branched copolyester comprises hard segments of polybutylene terephthalate (PBT) and polybutylene isophthalate (PBI), and soft segments selected from the group consisting of polytetramethylene oxide (PTMO), polyethylene oxide (PEO), polypropylene oxide (PPO), block copolymers of poly(ethylene oxide) and poly(propylene oxide), linear aliphatic polycarbonates, polybutylene adipate (PBA), derivates of dimer fatty acids, derivates of dimer fatty acid diols, linear aliphatic polyesters and combinations thereof.

15. The film according to claim 14, wherein the soft segments comprise polytetramethylene oxide (PTMO).

* * * * *